May 28, 1963

G. H. BREWIN 3,091,377

FORM MOVEMENT CONTROL SYSTEM

Filed Nov. 24, 1959

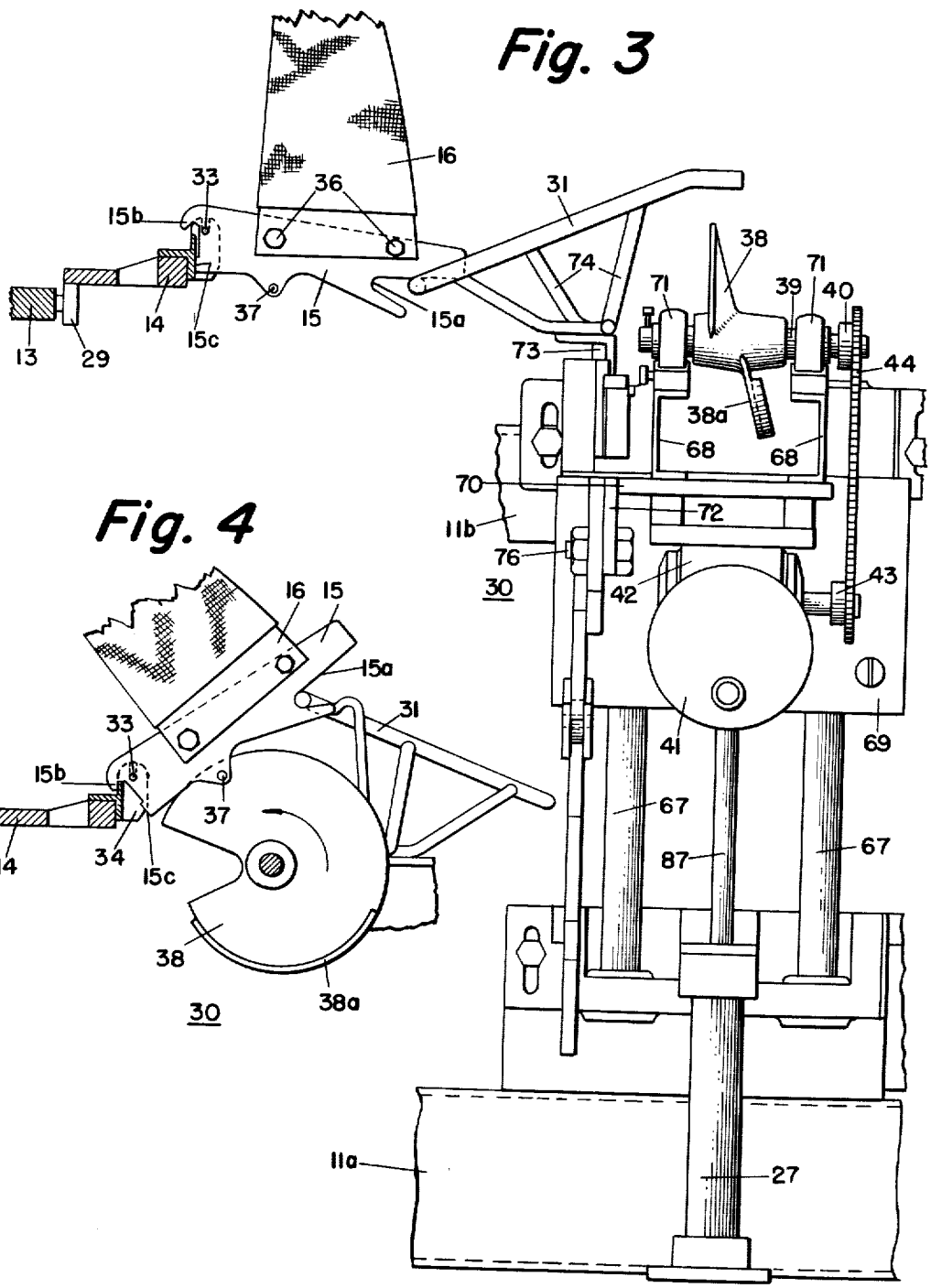

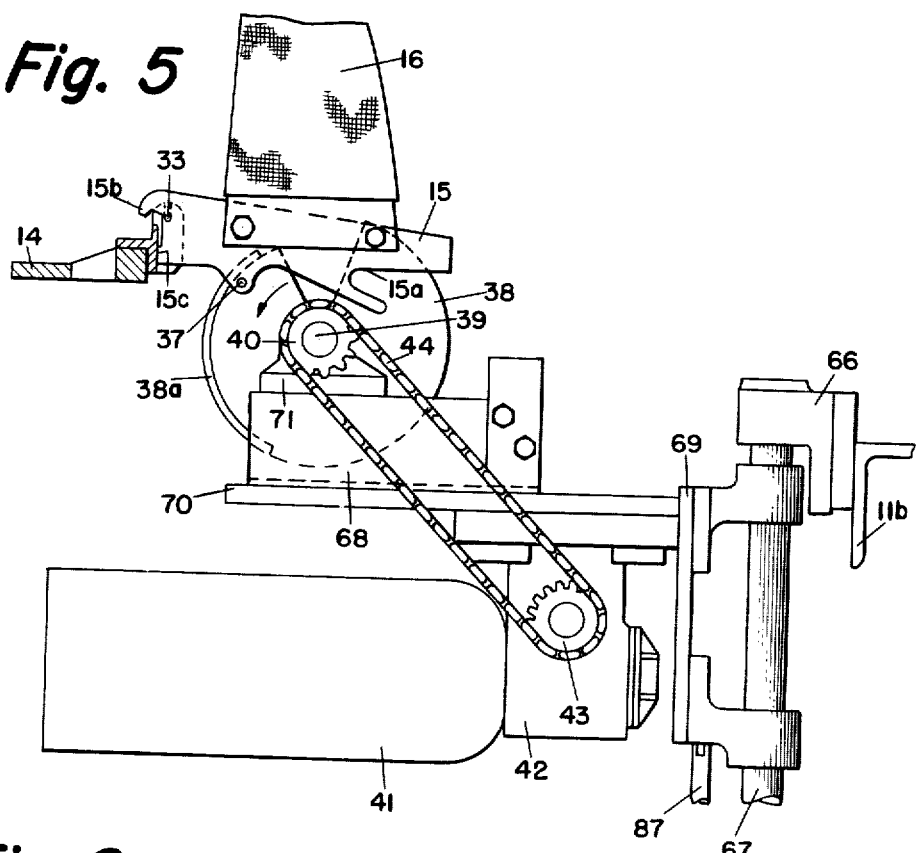
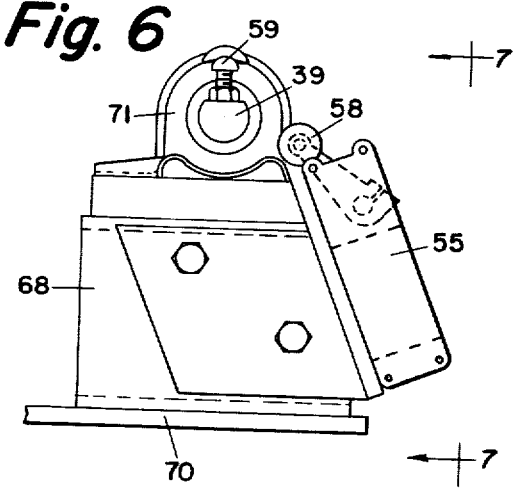
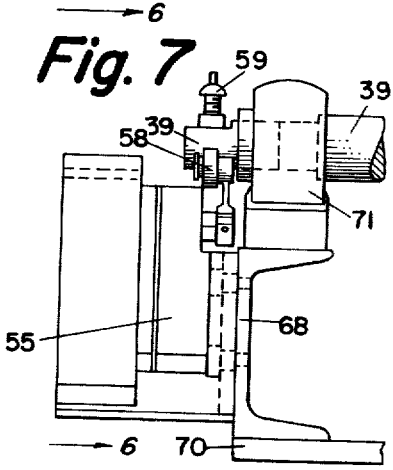

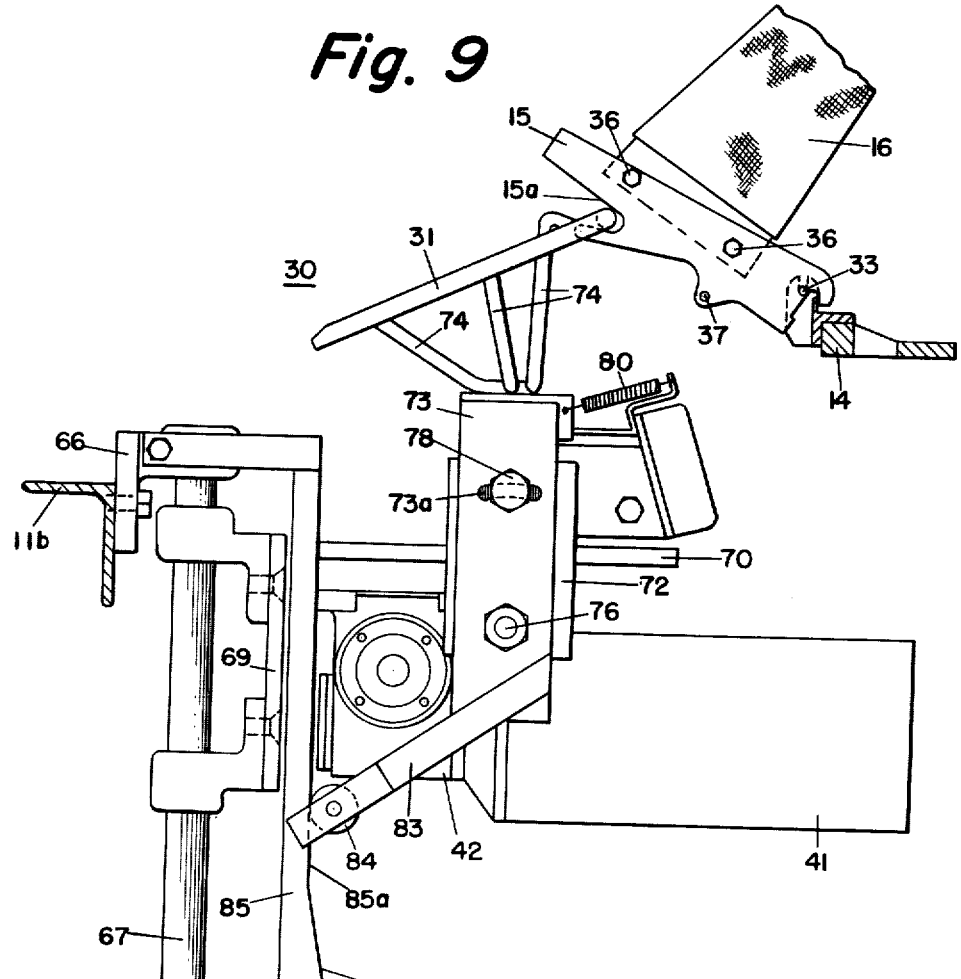
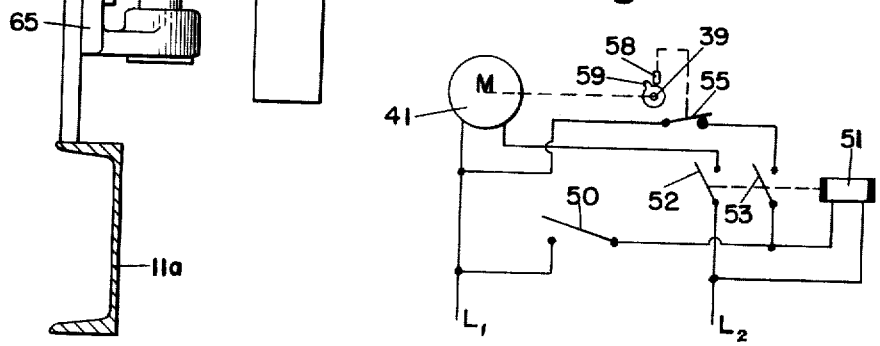

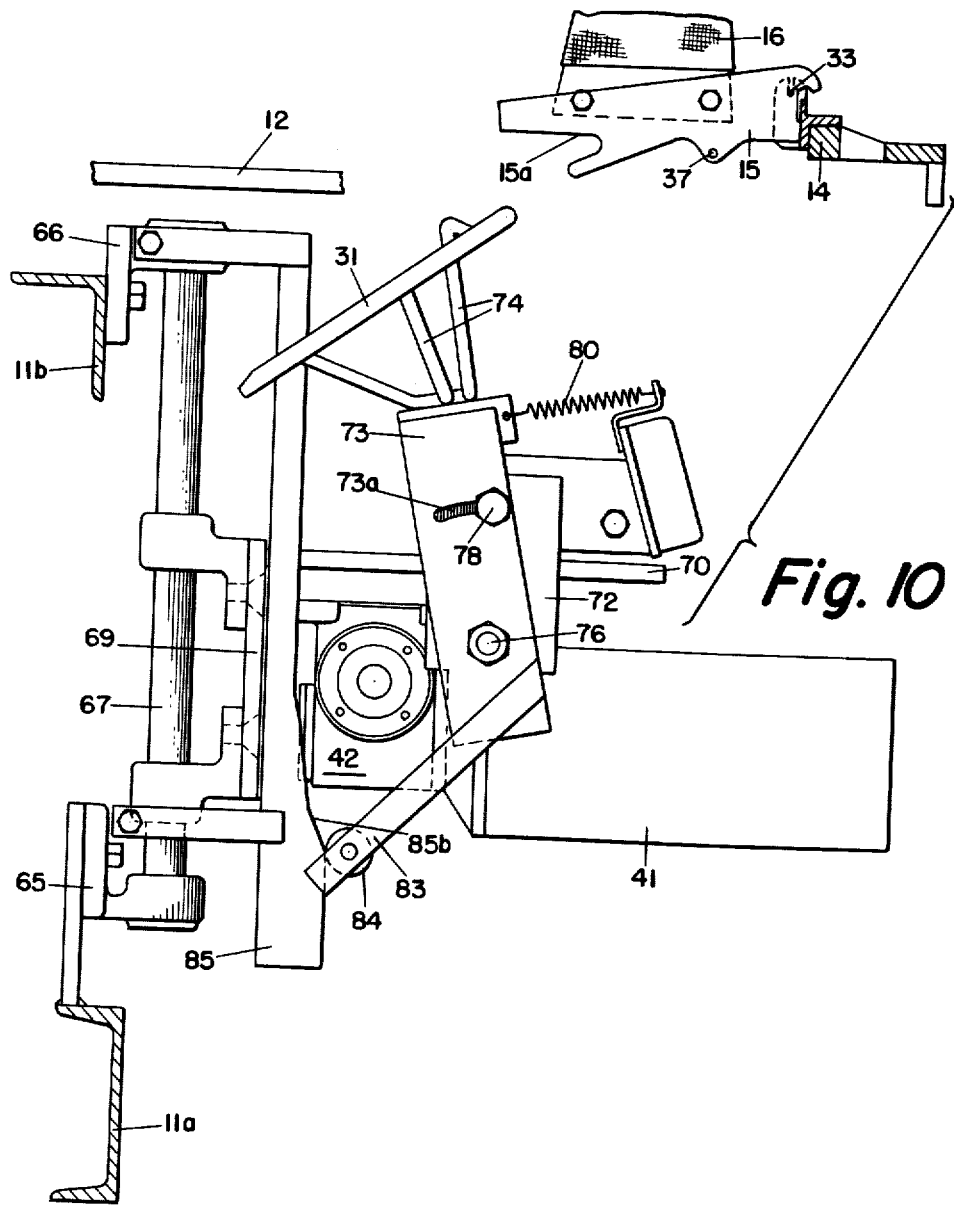

United States Patent Office 3,091,377
Patented May 28, 1963

3,091,377
FORM MOVEMENT CONTROL SYSTEM
Grant H. Brewin, Souderton, Pa., assignor, by mesne assignments, to Proctor Hydro-Set Company, Montgomeryville, Pa., a corporation of Pennsylvania
Filed Nov. 24, 1959, Ser. No. 855,038
13 Claims. (Cl. 223—76)

This invention relates to hosiery-treating machines and has for an object the provision of an improved form movement control system.

In the hosiery industry, it is the practice to place nylon stockings of both the flat knit full-fashioned type and the circular knit seamless type on individual forms or boards to receive the various treatments during the manufacturing process. Such treatments include dyeing and finishing, setting and drying. These treatments do not all take place at the same time and thus it is necessary for an operator to place the stockings on one set of forms for certain treatments and then strip them off and place them on other forms for additional treatments. Since the placing of the stockings on the forms and the subsequent stripping of the stockings from the forms after treatment are performed manually by an operator, the speed of the operator will determine the output for the hosiery-treating machine. During the treatment of the stockings, the forms are normally maintained in a vertical position and after the treatment, the forms are adapted to be pivoted to a tilted position to aid the operator in removal of the stockings and replacement of other stockings on the forms. Various arrangements have been proposed in the past for moving the forms to assist the operator in the loading and stripping operations. These prior arrangements have been reasonably satisfactory. However, they have left considerable to be desired since they have not enabled the operator to obtain a maximum output. In the prior arrangements, the operator has been required to move the form manually during at least some part of the loading or unloading operation or the operator has been required to move relative to the forms to different loading positions. All of these various changes in positions by the operator are time-and-energy consuming and tend to produce fatigue in the operator.

It has been found that by enabling the operator to make a single movement for either loading or unloading the forms that the speed of operation can be greatly increased, resulting in a substantial output from a machine. In accordance with the present invention, a plurality of vertical hosiery forms are pivotally mounted at their lower ends on a carriage for movement about a horizontal axis to a tilted loading position. There is disposed beneath the carriage means engageable with the lower ends of the forms for sequentially pivoting at least one of the forms from the vertical position to the tilted position at the loading station and there is further provided means for automatically returning the one form to its vertical position while advancing the carriage by the loading station and concurrently moving a succeeding form to the tilted position at the loading station. With this arrangement, the stocking forms are automatically moved in sequence to the same position at the loading station and after a stocking has been placed on the form or removed therefrom, as the case may be, the carriage moves with respect to the loading station so that a succeeding form is placed in tilted position at the loading station. Since the stocking forms are always at the same position relative to the operator at the loading station and since the carriage which supports the forms moves relative to the loading station, the operator soon finds that the forms can be loaded or unloaded with stockings by feel and without the need to look at the form. By thus simplifying the work of the operator, it is possible to realize a substantial increase in output from the machine.

For a more detailed description of the invention and for further objects and advantages thereof, reference is to be had to the following description taken in conjunction with the accompanying drawings in which:

FIG. 3 is a sectional view taken along the lines 3—3 in FIG. 2;

FIG. 4 is a fractional sectional view taken along the lines 4—4 in FIG. 2;

FIG. 5 is a fractional sectional view taken along the lines 5—5 in FIG. 2;

FIG. 6 is a fractional view taken along the lines 6—6 in FIGS. 2 and 7;

FIG. 7 is a view taken from the right-hand side of FIG. 6;

FIG. 8 is a wiring diagram showing the electrical system for controlling the form movement apparatus shown in FIG. 1;

FIG. 9 is a view taken from the left-hand side of FIG. 3, showing the form-controlling mechanism in raised position; and FIG. 10 is a view similar to FIG. 9 with the form-controlling mechanism shown in lowered position.

Figure 1:
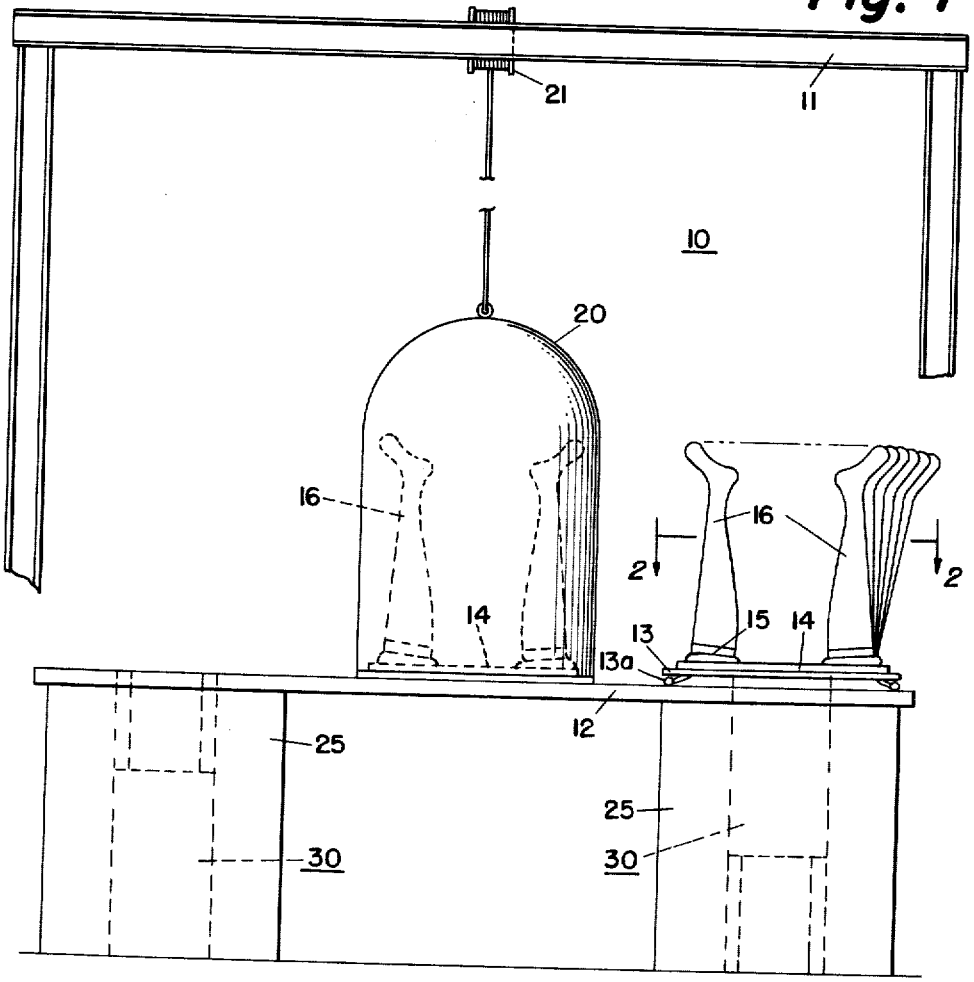
FIG. 1 is a diagrammatic view of a hosiery-treating machine embodying the present invention.

Referring to FIG. 1, there is diagrammatically illustrated a machine for treating hosiery which is generally of the type described and claimed in copending application Serial No. 499,382 filed April 5, 1955 by Harry E. Brewin and Grant H. Brewin, now United States Letters Patent No. 2,915,230. The hosiery-treating machine 10 in FIG. 1 includes a frame 11 which is adapted to support a pair of spaced horizontal tracks 12 on which ride the rollers 13a of carriers 13 which in turn support carriages 14 for relative movement. The carriages 14 have pivotally mounted thereon a plurality of supports 15 which in turn support individual stocking forms or boards 16.

The treating zone of the machine is located within a bell member 20 which is adapted to be moved vertically by suitable means, such as a hoist 21. To increase the output of the machine 10, two carriages 14 are mounted on carriers on the tracks 12, one of the carriages being adapted to be within the bell 20 for treatment of the stockings while the other carriage is disposed at one of the ends of the tracks 12 for loading or unloading of the stocking forms by an operator. In FIG. 1 one of the carriages 14 is disposed within the bell 20 and the other carriage 14 is located at the right-hand end of the tracks 12. After the stockings within the bell member 20 have been treated, the bell 20 is raised by the hoist 21 and the carriage which was under the bell is moved to the left-hand end of the tracks 12 for removal of stockings from the forms and for subsequent loading of the forms with stockings by an operator. At the same time the other carriage is moved under the bell for treatment of the stockings thereon. In this way there is no lost treating time in loading and unloading stockings from the forms by the operator.

The details of the machine as thus far described are disclosed in the aforesaid patent application. The present invention is concerned with the movement of the forms during the loading and unloading operations by an operator. The mechanism 30 for automatically actuating the individual forms is schematically illustrated in FIG. 1 as being confined within a housing 25. When the carriage 14 with the loaded forms is disposed beneath the bell 20, the forms are in a vertical position as illustrated by the schematic plan view shown in FIG. 1A. The forms maintain this position when they are moved along the rails 12 from their central position beneath the bell 20 to one of the ends of the tracks 12. At the loading station at the end of the tracks 12 a suitable lift such as hydraulic cylinder 27, FIG. 3, raises the form-actuating mechanism 30 from its lowered position beneath the tracks 12, FIGS. 1 and 10, to its upper or raised position, FIGS. 1, 3 and 9. The lift cylinder 27 may be controlled automatically by the position of the carriage, or manually by an operator, at the loading station.

The form-actuating mechanism 30 includes a stationary cam 31 which is in the form of a curved inclined bar as may be seen in FIGS. 2, 3, 4, 9 and 10. The cam 31 is adapted to be received within recesses 15a disposed on the underside of the form supports 15. The length of the cam 31 is adequate to be inserted within the slots 15a of a plurality of the form supports 15. The number of supports 15 concurrently engaged by the cam 31 will depend upon the spacing between the form supports and thus the total number of supports on the carriage. Usually there will be about a dozen supports concurrently engaged by the cam 31. As the form-actuating mechanism 30 is raised to its upper position, FIG. 9, from its lower position, FIG. 10, the cam 31 moves into the recesses 15a of the respective form supports 15 causing them to fan out in the manner indicated in FIG. 1B. Thus it will be seen that the supports located within the bracket A are tilted at various positions from a vertical position at one end of the bracket to the maximum inclined or tilted position at the loading station at the opposite end of the bracket A.

Figure 1A:
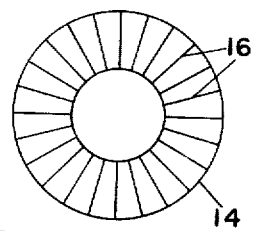
FIGS. 1A and 1B are diagrammatic plan views illustrating the stocking forms in vertical position, FIG. 1A, and with some of the forms moved to the tilted loading position, FIG. 1B.
Figure 2:
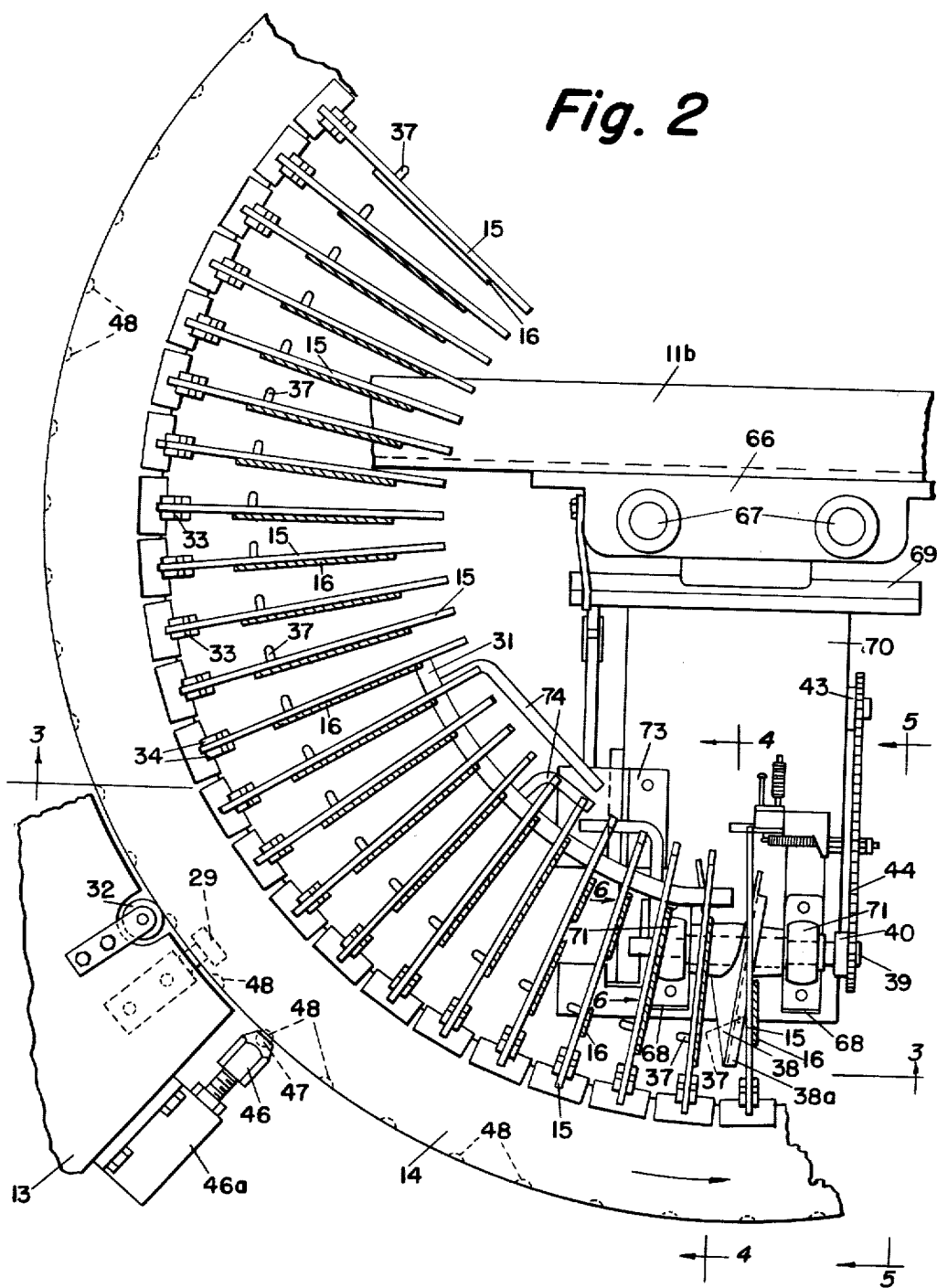
FIG. 2 is a fractional plan view taken along the lines 2—2 in FIG. 1.

Referring to FIG. 2, it will be seen that the various form supports or holders 15 and forms 16, which have been diagrammatically illustrated in FIG. 1A are illustrated in more detail. The carriage 14 is circular or ring-shaped and is sometimes referred to in the trade as a form ring. The carrier 13 for the carriage 14 includes a plate member which extends around about three-quarters of the circumference of the carriage 14 and is provided with a plurality of spaced rollers 29 which support the carriage 14 in a horizontal plane for rotation about a vertical axis. To aid in the rotational support for the carriage 14, the carrier plate 13 is provided with an additional set of rollers 32 which are arranged at right angles to the rollers 29 and engage the edge of the carriage 14, FIG. 2.

The form rings or carriages 14 may be provided with any suitable number of form holders or supports 15. These form holders 15 are spaced uniformly around the inner periphery of the ring 14. As illustrated in FIG. 2, the form holders 15 have been so spaced that the form ring 14 carries about sixty form holders. As may be seen in FIGS. 2 and 3, the form holders 15 are supported on pivots 33, the ends of which extend into spaced ears 34 which are fixed to the inner circumference of the form ring or carriage 14. The form holders 15 are provided with stops 15b and 15c which are adapted to engage the form ring 14 to limit the raised and lowered positions respectively of the form holders 15. As shown in FIG. 3, the form holder 15 is in its lowered or normal position preparatory to being rotated about pivot 33 by engagement of slot 15a with the inclined cam 31. The supports 15 are provided with suitable holes to receive bolts 36 for securing the forms 16 to the form holders 15. As may be seen in FIG. 2, each of the form holders 15 is provided with a projection or pin 37 which extends to one side of the form holders 15 and the purpose of which will hereinafter be described.

As above pointed out, it will be assumed that the form-actuating mechanism 30 has been raised to its upper or operating position. The inclined cam 31 has entered the slots 15a of the group of form holders 15 which is directly above the cam 31. The form holders 15 in this group are inclined at progressively increasing angles with respect to the vertical axis about their horizontal pivots 33 from a substantially vertical position as shown in FIG. 3 to the maximum inclined or tilted position as shown in FIG. 4. All of the other form holders 15 on the carriage 14 are in vertical position. The inclined cam 31 remains stationary while the carriage of form ring 14 is caused to rotate and thus move the form holders 15 up the incline of cam 31 and about the form holder pivots 33. This movement is caused by the engagement of a rotating cam 38, FIGS. 2 and 5 with the pins 37 on the form holders 15. The rotating cam 38 is shaped in the form of a worm and, as may be seen in FIG. 2, the right-hand face of the cam 38 is adapted to engage the end of the pin 37. As the cam 38 rotates, the worm surface causes the engaging pin 37 and its form holder 15 to be moved to the right as viewed in FIG. 2 which in turn causes the supporting carriage 14 to rotate in a counterclockwise direction about its central axis. The cam 38 rotates in a counterclockwise direction as viewed from the right-hand side of FIG. 2 and is carried by a shaft 39. The shaft 39 is provided with a sprocket wheel 40 which is driven from a motor 41 by way of a gear box 42, sprocket wheel 43 and chain 44, FIG. 5. The speed of rotation of the cam 38 is not critical. However, it has been found that a speed in the order of 45 r.p.m. is satisfactory. This speed may be changed, depending upon the speed of the operator in loading and unloading the forms 16.

The rotating cam 38 is provided with a lip 38a which is adapted to cooperate with the pins 37 on the form holders 15 and return them from their maximum tilted or loading position to their original or normal vertical position. As will be seen in FIG. 4, the cam 38 is rotating in a counterclockwise direction and the pin 37 is engaging the face of the cam 38. The form holder 15 is shown in its maximum tilted or loading position with the form holder 15 near the end of the stationary cam 31. As the rotary cam 38 rotates, the form holder 15 will be moved to the right as viewed in FIG. 2 and will move off of the end of the stationary cam 31. At this time the leading end of the lip 38a will have rotated from its position shown in FIG. 4 to a position in engagement with the pin 37 and as the cam 38 continues to rotate, the lip 38a will move the pin 37 downwardly and cause the form holder 15 to pivot downwardly from the position shown in FIG. 4 to the normal vertical position as shown in FIG. 5. Thus the form 16 will have been loaded or unloaded by the operator, as the case may be, at the loading station and then have been returned to its normal vertical position for continued movement by the carriage 14 around its central vertical axis. As one form moves past the loading station, a succeeding form is moved to the inclined or tilted position at the loading station ready for loading or unloading by the operator. This sequence of operations continues until all of the forms on the carriage 14 have been loaded or unloaded.

The operation of the carriage 14 is intermittent and this will be seen from the shape of the rotary cam 38. It will be noted in FIGS. 4 and 5 that the cam 38 is not continuous. As pointed out above, the cam 38 is constructed in the shape of a worm or screw having a single thread with the pitch of the thread corresponding to the spacing of the form holders 15 around the carriage 14. As illustrated in FIG. 4, the side face of the cam 38 is adapted to engage the end of a pin 37 during approximately 180° of rotation of the cam 38. During the next approximate 120° of rotation, the lip 38a engages the cylindrical surface of pin 37 causing the form holder 15 to pivot about its pivot 33 and return the form 16 to its vertical position similar to that shown in FIG. 5. With the cam 38 in this position, it will be seen that the pin 37 on the next form holder 15 has not yet been engaged by the cam 38. The next form holder 15 is in a maximum tilted position similar to the form holder shown in FIG. 4. This form holder is in a stationary position at the loading station and remains in such stationary position until the face of cam 38 engages the pin 37 on that form holder 15. The minimum transfer time when the carriage 14 remains stationary is controlled by the angular spacing between the ends of the cam 38.

It is important that the form holders 15 be positioned in predetermined relation with respect to the rotating cam 38. This predetermined relationship or indexing is maintained by cooperation of a spring-biased detent member 46, FIG. 2, which includes a ball member 47 which is adapted to be received in recesses 48 which are disposed around the outer periphery of carriage 14 at locations directly opposite the respective form holders 15. Thus, as the rotating cam 38 cooperates with the pins 37 on the respective form holders 15, the carriage 14 is rotated in a counterclockwise direction with a notching action, with the ball member 47 moving from one recess 48 to another along the periphery of carriage ring 14. The ball member 47 and recesses 48 cooperate to hold the carriage 14 in stationary position when the rotary cam 38 moves out of engagement with a pin 37 on one of the form holders 15 and before it moves into engagement with the pin 37 on the succeeding form holder 15. The spring-biased detent member 46 is carried by a bracket 46a which in turn is secured to the carrier plate 13.

Referring to FIG. 8, the control of the form-actuating mechanism 30 will now be described. The motor 41 is adapted to be energized from a suitable source of power indicated by lines L1 and L2. To start the motor 41 for rotation of cam 38, the operator closes a normally-open switch 50, preferably of the foot-operated type, which completes a circuit through a relay 51, thus energizing the relay and causing the contacts 52 and 53 thereof to move to closed position. The closing of contacts 52 completes a circuit from line L1 through motor 41 and closed contacts 52 to the other side of the line L2. This causes the cam 38 to start its rotation. The operator may then permit the switch 50 to be opened. However, the motor 41 continues to run by reason of the fact that the relay 51 continues to be energized through a holding circuit extending through contacts 53 and the normally-closed switch 55 which connects relay 51 with the opposite side of the line L1. Switch 55 is of the cam-operated type and is shown in FIGS. 6 and 7 as including a roller-type operator 58 which is adapted to be engaged by a cam 59 secured to the rotatable shaft 39 on which the cam 38 is mounted. As the motor 41 continues to drive the shaft 39 by way of the gear reduction unit 42, the cam 59 carried by the shaft 39 revolves until it engages the cam follower 58 causing the switch 55 to move to open position. This breaks the circuit through contacts 53 to the coil of relay 51. Since the relay 51 is no longer energized, the contacts 53 and 52 move to open position and the motor 41 is deenergized causing the rotation of cam 38 to stop. At this time one of the form supports 15 is in the tilted or loading position at the loading station ready for loading or removal of a stocking by the operator.

The operator may control the amount of time required for the loading or unloading operation as the motor 41 will not start and the carriage 14 will not be advanced past the loading station until the switch 50 is again closed. When an operator becomes experienced, only a relatively short time is required for an unloading operation of the forms and the foot switch 50 may be kept closed continuously so that the motor 41 will operate continuously and the only stationary period of the carriage 14 will be that due to the angular spacing between the ends of the rotary cam 38. This will provide for maximum output of the machine. This is due to the fact that the forms are automatically tilted to the same position for loading and unloading and automatically return to their vertical position with the carriage 14 automatically moving past the operator at the loading station.

As previously pointed out, the form-actuating mechanism 30 is adapted to be moved between an upper operating position, FIG. 9, and a lower inactive position, FIG. 10. This construction will now be described. As may be seen in FIGS. 3 and 9, the frame of the machine includes a horizontal base member 11a and a cross member 11b parallel thereto and spaced thereabove. Similar frame members are disposed at the opposite ends of the machine 10, FIG. 1. Secured to the frame members 11a and 11b, FIG. 9, are support members 65 and 66 which are adapted to maintain a pair of posts 67 in vertical spaced relation, FIG. 3. The posts 67 provide the guides for a vertical sliding base member 69 for the motor 41 and the gear reduction unit 42. As may be seen in FIG. 5, the vertical motor base 69 is provided with a projecting horizontal plate 70 from which the gear reduction unit 42 and motor 41 are suspended. Mounted on channels 68, 68 on the top of the plate 70 is a pair of bearing supports 71, 71 which rotatably support the opposite ends of the shaft 39, FIGS. 2 and 3, which in turn supports the rotating cam 38. The horizontal plate 70 has secured thereto a vertical plate 72 which pivotally supports a bracket 73. The bracket 73 has secured to the upper end thereof a plurality of support rods 74 which in turn support the inclined cam 31, FIG. 9. The bracket 73 is pivoted to the vertical plate 72 at a pivot 76 and the upper end of the bracket 73 is provided with a slot 73a through which a bolt 78 extends to stabilize the bracket 73 during its pivotal movement. The bracket 73 is maintained in its normal vertical position, FIG. 9, by means of a tension spring 80, one end of which is connected to the pivotal bracket 73 and the opposite end of which is connected to a stationary support.

The lower end of bracket 73 has attached thereto a lever arm 83, the outer end of which is provided with a roller 84 which is adapted to engage the surface of a cam 85. The cam 85 is maintained in stationary vertical position as by being bolted to the stationary support members 65 and 66. In FIG. 3 it will be seen that the hydraulic hoist cylinder 27 is provided with a plunger 87 to the upper end of which is connected the sliding base member 69, FIG. 5.

Figure 1B:
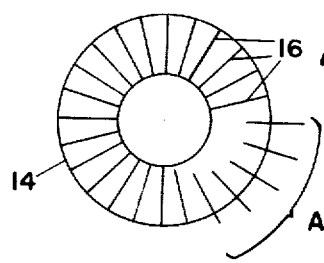

After the operator has completed stripping or loading all of the forms on the carriage, it will be noted that the stationary inclined cam 31 will have engaged the form holders 15 within bracket A, FIG. 1B, for a second time and the forms 16 supported thereby will be in a fanned relation similar to those shown in FIGS. 2 and 1A. Before the carriage 14 can be moved into treating position beneath the bell 20, FIG. 1, it is necessary that all of the forms 16 be returned to their vertical position as shown in FIG. 1A. To accomplish this, the hydraulic cylinder 27 is operated to permit the plunger 87 to be lowered which in turn lowers the vertical base member 69 and all the parts of the form-actuating mechanism 30 supported thereon. During this lowering movement, it will be noted that the cam roller 84, FIG. 9, moves downwardly on vertical cam surface 85a until it reaches an inclined cam surface 85b. While the cam roller 84 is on the vertical cam surface 85a, the cam 31 continues to engage the slots 15a of the form holders 15 causing the latter to rotate about their pivots 33 and move the forms 16 from their tilted positions, FIG. 1B, to their normal vertical positions, FIG. 1A. When the cam roller 84 moves on to the sloping surface 85b, the lever arm 83 causes the bracket 73 to rotate in a counterclockwise direction about the pivot 76 moving the cam 31 outwardly of the slots 15a. This movement of cam 31 continues as the vertical supporting base 69 continues to be lowered to its bottom or lowered position, as shown in FIG. 10. In this position, the inclined cam 31 has been completely withdrawn from the slots 15a of the form supports and moves below them so that the carriage 14 may be moved to the left as viewed in FIG. 10 along the rails 12 without interference by the cam 31.

After the forms 16 have been loaded with stockings and returned to the vertical position of FIG. 1A, the carriage 14 is then ready to be placed under the treating dome 20 in FIG. 1 and the other carriage removed therefrom for movement to the opposite end of the track 12 for removal of stockings from the forms in the manner previously described.

While a preferred embodiment of this invention has been illustrated, it is to be understood that other modifications thereof may be made within the scope of the appended claims.

What is claimed is:

1. In a hosiery-treating machine, a carriage movable in a horizontal plane, a plurality of vertical hosiery forms pivotally mounted at predetermined spaced locations on the same said carriage for movement about a horizontal axis to a tilted loading position, means for sequentially moving at least one of said forms from vertical position to the tilted position at a loading station, and means for advancing said carriage, said last-named means including means sequentially engaging said forms for automatically returning said one form to its vertical position while concurrently advancing said carriage by the loading station only a distance corresponding with the predetermined spacing between adjacent forms on said carriage to move a succeeding one of said forms on said carriage to the tilted position at the loading station.

2. In a hosiery-treating machine, a horizontal track, a carriage slidably supported on said track, a plurality of vertical hosiery forms pivotally mounted on form holders supported by said carriage at predetermined spaced locations, said hosiery forms being movable about a horizontal axis to a tilted loading position, and form-actuating mechanism comprising first cam means engageable in sequence with said form holders, second cam means engageable in sequence with said form holders, and power operated means cooperating with said second cam means to produce relative movement between said form holders and said carriage to return said form holders from said tilted position to said vertical position, said second cam means having a shape such that movement of said carriage a distance corresponding to the predetermined spacing between adjacent forms returns one of said forms to its treating position and out of engagement with said second cam means.

3. In a hosiery-treating machine, a horizontal track, a carriage slidably supported on said track, a plurality of vertical hosiery forms pivotally mounted on form holders supported by said carriage at predetermined spaced locations, said hosiery forms being movable about a horizontal axis to a tilted loading position, and form-actuating mechanism disposed beneath said track, said form-actuating mechanism comprising stationary cam means and rotatable cam means being adapted for engagement with said form holders, said rotatable cam means being shaped in the form of a worm having a pitch corresponding to the predetermined spacing between said form holders.

4. In a hosiery-treating machine including a horizontal track and a carriage slidably supported on said track and having a plurality of hosiery forms all pivotally mounted on the same said carriage for movement about a horizontal axis between a treating position and a boarding position, the improvement of automatic form-actuating mechanism disposed beneath said carriage comprising means for applying a force to said forms progressively to pivot said forms about the horizontal axis toward the boarding position, power-operated rotatable means for individually returning said forms from the boarding position to the treating position while said rotatable means is concurrently moving said carriage with respect to said track, and means for indexing the position of said carriage relative to said rotatable means.

5. In a hosiery-treating machine, a ring-shaped carriage, a plurality of hosiery forms disposed in predetermined spaced relation around the circumference of said ring-shaped carriage and pivotally mounted on said carriage for movement only about a horizontal axis from a treating position to a tilted loading position, means supporting said carriage for rotation about the central axis thereof, means for pivoting at least one of said forms from the treating position to the tilted position at a loading station, and means for automatically returning said one form to its treating position while said last-named means in concurrently rotating said carriage by the loading station a distance corresponding with the predetermined spacing between adjacent forms and moving another of said forms to the tilted position at the loading station.

6. In a hosiery-treating machine, a ring-shaped carriage, a plurality of hosiery forms disposed in spaced relation around the circumference of said ring-shaped carriage, each of said hosiery forms being carried by a pivotally supported form holder on said ring-shaped carriage, said form holders being equally spaced around the circumference of said ring-shaped carriage, means supporting said carriage for rotation about the central axis thereof, each of said form holders having cam recesses therein, means for pivoting at least one of said forms from a treating position to a tilted position at a loading station, said last-named means comprising a cam structure adapted to be received in said cam recesses of said form holders, and means for automatically returning said one form to its treating position while said last-named means is concurrently rotating said carriage by the loading station and moving another of said forms to the tilted position at the loading station, said last-named means comprising a rotatable spiral cam and means on said form holders engageable with means on said spiral cam.

7. In a hosiery-treating meachine, a horizontal track, a carriage slideably supported on said track, a plurality of vertical hosiery forms pivotally mounted on form holders supported by said carriage, said hosiery forms being movable about a horizontal axis to a tilted loading position, form-actuating mechanism disposed beneath said track, said form-actuating mechanism comprising inclined stationary cam means and rotatable cam means shaped in the form of a worm, both of said cam means being adapted for engagement with said form holders, and means for raising and lowering said form-actuating mechanism for movement of the same into and out of operating position with respect to said forms.

8. In a hosiery-treating machine according to claim 7 wherein said inclined cam means concurrently engages a group of said form holders, and said rotatable cam means successively engages said form holders in said group to remove said form holders in succession from engagement with said inclined cam.

9. In a hosiery-treating machine according to claim 8 wherein said form holders are equidistantly spaced apart, and said rotatable cam shaped in the form of a worm has a pitch corresponding to the spacing between said form holders.

10. In a hosiery-treating machine according to claim 8 wherein said form holders are provided with recesses into which said inclined cam extends, said inclined cam being adapted to engage said form holders in said group and move them to progressively inclined positions when said form-actuating mechanism is in its raised operating position, said inclined cam means being pivotally mounted and adapted to be withdrawn from its normal stationary position within said recesses of said form holders when said form-actuating mechanism is lowered to its inactive position.

11. In a hosiery-treating machine, a ring-shaped carriage a plurality of hosiery form holders disposed in uniformly spaced relation around the circumference of said ring-shaped carriage and pivotally mounted to said carriage for movement of vertical hosiery forms supported by said form holders from a vertical position to a tilted loading position, means supporting said carriage for rotation about the central axis thereof, and form-actuating mechanism including means for pivoting at least one of said form holders from said vertical position to the tilted loading position and means for automatically returning said one form holder to its vertical position while said last-named means is concurrently rotating said carriage and moving another of said forms to the tilted loading position, said form-actuating mechanism comprising a stationary inclined cam engageable with said form holders and a rotatable cam individually engageable with said form holders for moving said form holders in succession out of engagement with said inclined cam.

12. In a hosiery-treating machine according to claim 11 wherein said rotatable cam is shaped in the form of a worm having a pitch corresponding to the uniform spacing of said form holders about said carriage, and the ends of said worm are angularly spaced to provide intermittent rotation of said carriage about said central axis thus providing a period of rest for said forms in said tilted loading position.

13. A hosiery-treating machine comprising a movable carriage, a plurality of vertical hosiery forms carried by form holders all pivotally mounted on the same said carriage for movement about a horizontal axis between a treating position and a boarding position, inclined stationary cam means for applying a force to said form holders progressively to pivot said forms about the horizontal axis towards said boarding position, cyclically operable rotatable means engageable with said form holders for individually returning said forms from said boarding position to said treating position, means for indexing said carriage with respect to said rotatable means, and electrical means controlled by the operator for controlling the cyclical operation of said rotatable means.

References Cited in the file of this patent

UNITED STATES PATENTS

| | | |
|---|---|---|
| 1,126,619 | Coulston et al. | Jan. 26, 1915 |
| 2,299,040 | Schwartz | Oct. 13, 1942 |
| 2,419,645 | Hurxthal | Apr. 29, 1947 |
| 2,525,111 | Astphan | Oct. 10, 1950 |
| 2,856,109 | Richter | Oct. 14, 1958 |

UNITED STATES PATENT OFFICE
CERTIFICATE OF CORRECTION

Patent No. 3,091,377                                    May 28, 1963

Grant H. Brewin

It is hereby certified that error appears in the above numbered patent requiring correction and that the said Letters Patent should read as corrected below.

Column 8, line 12, for "in" read -- is --.

Signed and sealed this 7th day of April 1964.

(SEAL)
Attest:

ERNEST W. SWIDER

Attesting Officer

EDWARD J. BRENNER

Commissioner of Patents